(12) United States Patent
Salsamendi et al.

(10) Patent No.: US 9,146,767 B2
(45) Date of Patent: Sep. 29, 2015

(54) SECURE CLOUD HYPERVISOR MONITOR

(71) Applicant: Raytheon Company, Waltham, MA (US)

(72) Inventors: Ryan C. Salsamendi, Palm Bay, FL (US); Michael J. Simms, Indialantic, FL (US); John R. Wagner, Melbourne, FL (US)

(73) Assignee: Raytheon Company, Waltham, MA (US)

( * ) Notice: Subject to any disclaimer, the term of this patent is extended or adjusted under 35 U.S.C. 154(b) by 171 days.

(21) Appl. No.: 13/770,664

(22) Filed: Feb. 19, 2013

(65) Prior Publication Data

US 2013/0340077 A1  Dec. 19, 2013

Related U.S. Application Data

(60) Provisional application No. 61/661,381, filed on Jun. 19, 2012.

(51) Int. Cl.
| | |
|---|---|
| *H04L 29/06* | (2006.01) |
| *G06F 9/455* | (2006.01) |
| *G06F 21/56* | (2013.01) |
| *G06F 21/55* | (2013.01) |
| *G06F 21/53* | (2013.01) |

(52) U.S. Cl.
CPC .......... *G06F 9/45558* (2013.01); *G06F 21/554* (2013.01); *G06F 21/56* (2013.01); *G06F 21/566* (2013.01); *G06F 9/45533* (2013.01); *G06F 21/53* (2013.01); *G06F 2009/45583* (2013.01); *G06F 2009/45587* (2013.01)

(58) Field of Classification Search
CPC .............................. G06F 9/45533; G06F 21/53
USPC ................................ 726/23, 26; 711/6; 718/1
See application file for complete search history.

(56) References Cited

U.S. PATENT DOCUMENTS

| | | | |
|---|---|---|---|
| 2006/0053492 A1 | 3/2006 | Wallace | |
| 2006/0221832 A1* | 10/2006 | Muller et al. | ................. 370/235 |
| 2008/0317245 A1* | 12/2008 | Wei et al. | ........................ 380/30 |
| 2011/0047543 A1 | 2/2011 | Mohinder | |
| 2011/0082962 A1 | 4/2011 | Horovitz et al. | |

(Continued)

OTHER PUBLICATIONS

International Search Report dated Sep. 26, 2013 in connection with International Patent Application No. PCT/US2013/046481, 5 pages.

(Continued)

*Primary Examiner* — Harunur Rashid
*Assistant Examiner* — Angela Holmes

(57) ABSTRACT

This disclosure addresses systems and methods for the protection of hardware and software in a computing environment. A hypervisor-monitor may be nested between the hardware of a host system and a hypervisor that is capable of supporting one or more guest virtual machines. The hypervisor-monitor may intercept exceptions generated by one or more processors in the host system and inspect software instructions for the hypervisor and the guests. Inspection may include performing a hash of the software instructions and a comparison of the hash with authorized software modules or a set of known malware. In this manner the hypervisor-monitor may monitor prevent the execution of malware by the hypervisor or the guests or provide a record of when code of an unknown origin was executed.

20 Claims, 4 Drawing Sheets

(56) References Cited

U.S. PATENT DOCUMENTS

2011/0185417 A1    7/2011    Zhou et al.
2013/0111591 A1*    5/2013    Topan et al. .................... 726/24

OTHER PUBLICATIONS

Written Opinion of International Searching Authority dated Sep. 26, 2013 in connection with International Patent Application No. PCT/US2013/046481, 7 pages.

Litty, et al.; "Manitou: A Layer-Below Approach to Fighting Malware"; Dept of Computer Science, University of Toronto; Oct. 21, 2006; XP055079350; pp. 6-11.

Specification titled "Methods and Apparatuses for Monitoring Activities of Virtual Machines" filed May 7, 2013; U.S. Appl. No. 13/888,849; 16 pages.

Specification titled "Hypervisor-Based Binding of Data to Cloud Environment for Improved Security" filed Dec. 9, 2013; U.S. Appl. No. 14/101,166; 27 pages.

Raytheon Pikewerks Corporation; Second Look; 2013; http//secondlookforensics.com/; 28 pages.

"International Application Serial No. PCT/US2013/046481, International Search Report mailed Sep. 26, 2013", 4 pgs.

"International Application Serial No. PCT/US2013/046481, Written Opinion mailed Sep. 26, 2013", 7 pgs.

Litty, L. et al., "Manitou: A Layer-Below Approach to Fighting Malware", *Proceedings of the 1st Workshop on Architectural and System Support for Improving Software Dependability (ASID '06)*.

* cited by examiner

SECURE CLOUD HYPERVISOR MONITOR

PRIORITY

This patent application claims the benefit of priority to Ryan C. Salsamendi et al. U.S. Provisional Patent Application Ser. No. 61/661,381, titled "SECURE THE CLOUD," filed on Jun. 19, 2012, which is hereby incorporated by reference herein in its entirety.

TECHNICAL FIELD

This document pertains generally, but not by way of limitation, to hardware and software security in a computing environment.

BACKGROUND

A host machine or server may utilize a hypervisor to monitor the execution of a virtual machine utilizing a guest operating system. The hypervisor may manage multiple instances of one or more guest operating systems that share the virtualized hardware resources of the host machine. A Type-1 hypervisor runs directly on the hardware of the host machine. A Type-2 hypervisor runs between the operating system of the host machine and the one or more guest operating systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine. Further, introducing artificial delays between input and response should not cause the functionality to be outside the scope of real-time, unless the delay serves a particular purpose.

Page fault—For the purposes of this specification and the associated claims, the term "page fault" is used to refer to an interrupt or exception generated by a processor in response to a request or attempt to access instructions or data that have not been loaded into a physical memory coupled to the processor, or otherwise made accessible to the processor. However, the use of the term "page-fault" is not intended to preclude the use of any processor or architecture that may describe memory management, virtual memory, or memory paging in other terms. Further, the use of a memory management unit, translation look-aside buffer, or other logic to manage a virtual address space accessible to a processor should not cause the functionality to be outside of the scope of a page fault.

As computing resources continue to progress toward cloud-based solutions, such as the hosting of data and computer processing capabilities in data centers with multiple processors each capable of supporting multiple systems, security and introspection into the host systems will become an ever increasing challenge. Achieving the goal of monitoring and authenticating code (e.g., programs and services) that is to execute on any individual processor of a host system becomes more difficult as the complexity, number of processors, hypervisors and variety of virtual machines supported by host systems grows.

Figure 1:
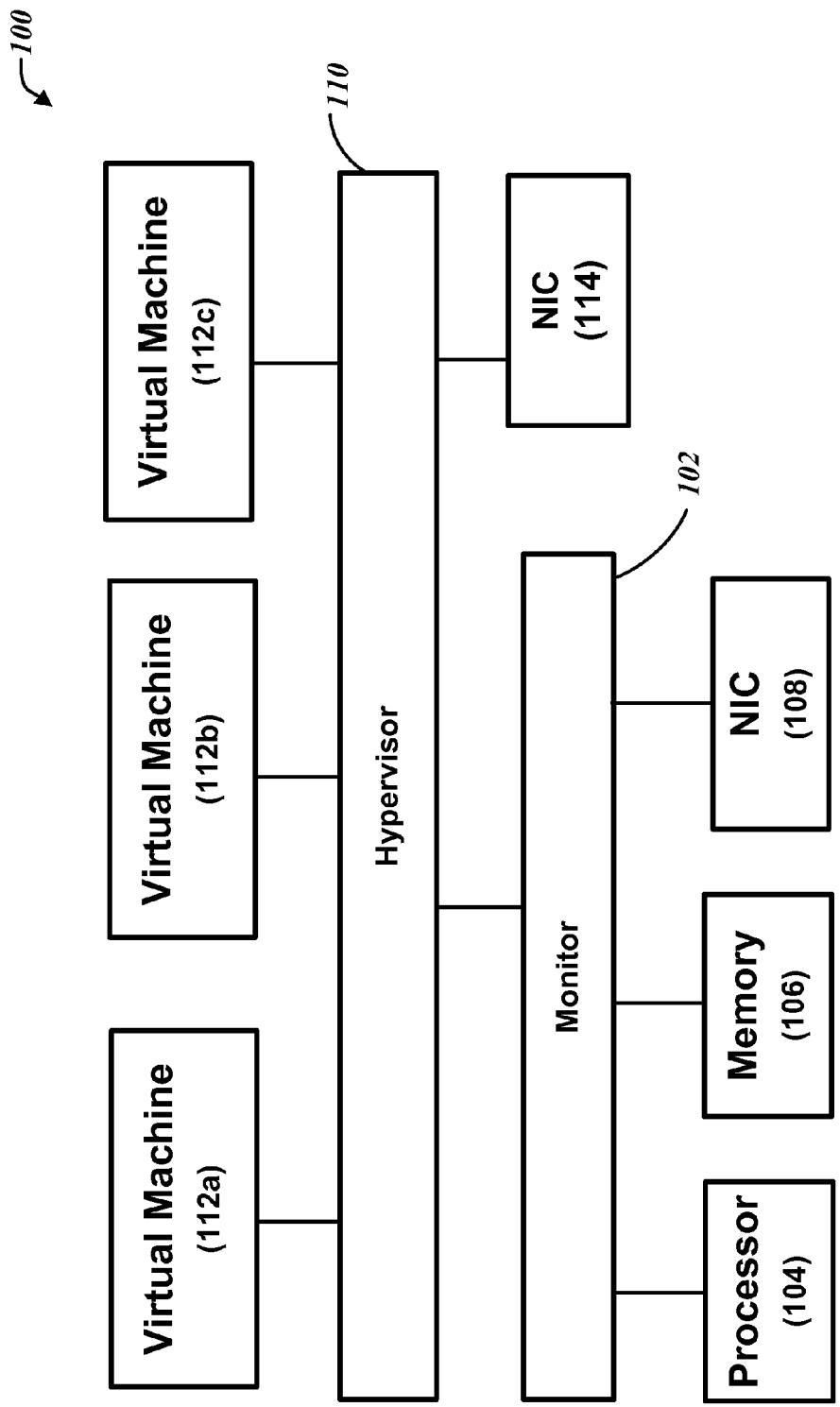
FIG. 1 illustrates an example block diagram of a host system equipped with a hypervisor monitor, in accordance with some embodiments.

FIG. 1 illustrates an example block diagram of a host system 100 equipped with a hypervisor monitor 102. The monitor 102 may directly interact with components of the host system, such as a processor 104, a memory 106 (e.g., random access memory (RAM), read only memory (ROM), or other computer readable storage mediums), and a network interface card (NIC) 108. The monitor 102 may be configured to handle exceptions (e.g., page faults) that are generated by the processor 104. may utilize a memory manager to The host system 100 may also include a memory manager (not shown) to allow the processor 104 to address multiple pages of virtual memory such that the memory 106 may appear to the processor 104 as having a larger address space than physically provided.

In an example, the monitor 102 may encapsulate an exception handler of the hypervisor 110 such that the monitor 102 may control or limit the execution of the exception handler of the hypervisor 110 by the processor 104. In this manner the monitor 102 may be nested between the hardware of the host system 100 and the hypervisor 110 executing on the host system 100.

The hypervisor 110 may manage and monitor guest operating systems forming one or more virtual machines 112. One or more operating systems may be utilized on the virtual machines 112. For example, virtual machine 112a may utilize a version of MICROSOFT WINDOWS SERVER, virtual machine 112b may utilize a first version of LINUX, and virtual machine 112c may utilize a version of HP-UX. Other operating systems in various combinations forming any number of virtual machines may be accommodated depending on the performance capabilities of the processor 104 and the hardware of the host system 100. While only a single processor 104 is depicted in the host system 100, multiple processors or multi-core processors may be included in the host system 100. In an example, the monitor 102 may be configured to interact with a single processor, or multiple processors.

The hypervisor 110 may also be configured to communicate with a network (e.g., the Internet) via a NIC 114. In this manner the hypervisor 110 may allow the virtual machines 112 access to the network while the host system 100 limits the ability of the virtual machines 112 to directly interact with other hardware of the host system 100. The hypervisor 110 may be isolated from, or otherwise prevented from accessing, the NIC 108 coupled to the monitor 102. Examples of commercially available hypervisors may include: XEN available from Citrix Systems, Inc. of Fort Lauderdale, Fla., and ESXi available from VMware of Palo Alto, Calif. Other Type-1 or Type-2 hypervisors may also be utilized on host system 100 in combination with monitor 102.

In an example, the monitor 102 may perform real-time behavior-based malware detection in any less privileged systems. Less privileged systems may include the hypervisor 110, the virtual machines 112, or other software (e.g., an operating system or application programs) that may be executed on the host system 100. The monitor 102 may be configured to detect malicious code that is attempting to circumvent the guest machine sandbox environments formed by the virtual machines 112. In response to the detection of malicious code the monitor 102 may prevent the processor 104 from executing the malicious code.

In an example, the monitor 102 may be configured to efficiently nest itself between the less-privileged hypervisor 110 and the hardware of host system 100. From this vantage point between the hardware of the host system 100 and hypervisor 110, the monitor 102 may read data from memory 106 and set breakpoints in both the less-privileged hypervisor and its guest virtual machines 112. This introspection enables monitor 102 to perform behavior-based malware detection in any of the less privileged systems (e.g., virtual machine 112*b*). The monitor 102 may be configured to detect malicious code by comparing hash values generated by performing a mathematical hashing algorithm to a portion of suspect code against hash values generated from known or suspected malware.

In an example, the monitor 102 may be configured to detect the presence of foreign code that is executing or attempting to execute on the system 100. A program containing executable instruction code that is authorized or registered to execute on the host system 100 may be uniquely identified (e.g., hashed) prior to, or immediately after, installation of the executable instruction code on a storage medium coupled to the processor 104. In an example, prior to installation of the executable instruction code, a separate registration system or tool may generate a list of identifiers (e.g., hashes) of portions of the executable instruction code. The list may be transmitted from the registration system or tool to the monitor 102 via the NIC 108. In an example, the registration system or tool may scan the executable instruction code for malware or viruses prior to performing the hash on the executable instruction code. In an example, immediately after installation of the executable instruction code on the host system 100, a registration system or tool at the monitor 102 may generate a list of hashes of portions of the executable instruction code.

By identifying the executable instruction code prior to execution (e.g., before or immediately after installation) a baseline identity for the executable instruction code may be established and used for subsequent comparisons. A list of identifiers (e.g., hashes) for any registered or known instruction code may be maintained in memory 106, the monitor 102, or in a non-volatile computer readable storage medium coupled to the monitor 102. Any instruction code that has not been previously identified may be flagged or logged as foreign code for additional inspection, and prevented from being executed by the processor 104.

In an example, monitor 102 may be configured to flag, or set break points, in the memory 106 that contains instruction code to be executed by the processor 104 for the hypervisor 110 or the virtual machines 112. The flag may be utilized by the monitor 102 to stop execution of the processor 104 at a specific location in the instruction code such that the processor 104 is prevented from executing any instructions after a break point until the monitor 102 removes the break point. For example, the monitor may perform a further inspection or debugging of the instruction code. In this manner the monitor 102 may provide further analysis of potential malware or prevent malware execution by the processor 104.

In an example, the processor 104 may be configured to notify (e.g., through a hardware event or interrupt) the monitor 102 when a page fault occurs during execution of the processor 104. Page faults may occur whenever a program attempts to access an address in memory (e.g., execute instruction code) that is not loaded into the memory 106, or has otherwise not been indicated as being accessible to the processor 104. For example, a memory manager disposed between the processor 104 and the memory 106 may generate an exception in response to a request from the processor 104 for a page of virtual memory that is not physically loaded into memory 106. Because the monitor 102 is operating at a greater privilege level than the hypervisor 110, the monitor 102 may intercept these hardware events (e.g., page faults). The monitor 102 may set a break point after a load-memory instruction in a stack of the processor 104 such that the monitor 102 may wait until the requested page of memory is loaded into memory and then prevents further execution of any instruction code loaded into the page of memory by the processor 104.

Once the new code is loaded into the memory 106, a mathematical hash (e.g., the Bob Jenkins' "lookup3" or "Spooky-Hash" algorithms) of the code may be computed. The Jenkins "lookup3" algorithm is an example of a relatively fast, non-cryptographic hash routine that the monitor 102 may utilize to represent four-kilobyte pages of instruction code as 32-bit values. Other mathematical hash algorithms or efficient code identification mechanisms may also be utilized. The computed hash values may be compared with a list of hash values that were previously computed from a known, valid copy of the hypervisor 110. Code of unknown origin may be reported to the system administrator (e.g., via a syslog protocol).

Figure 2:
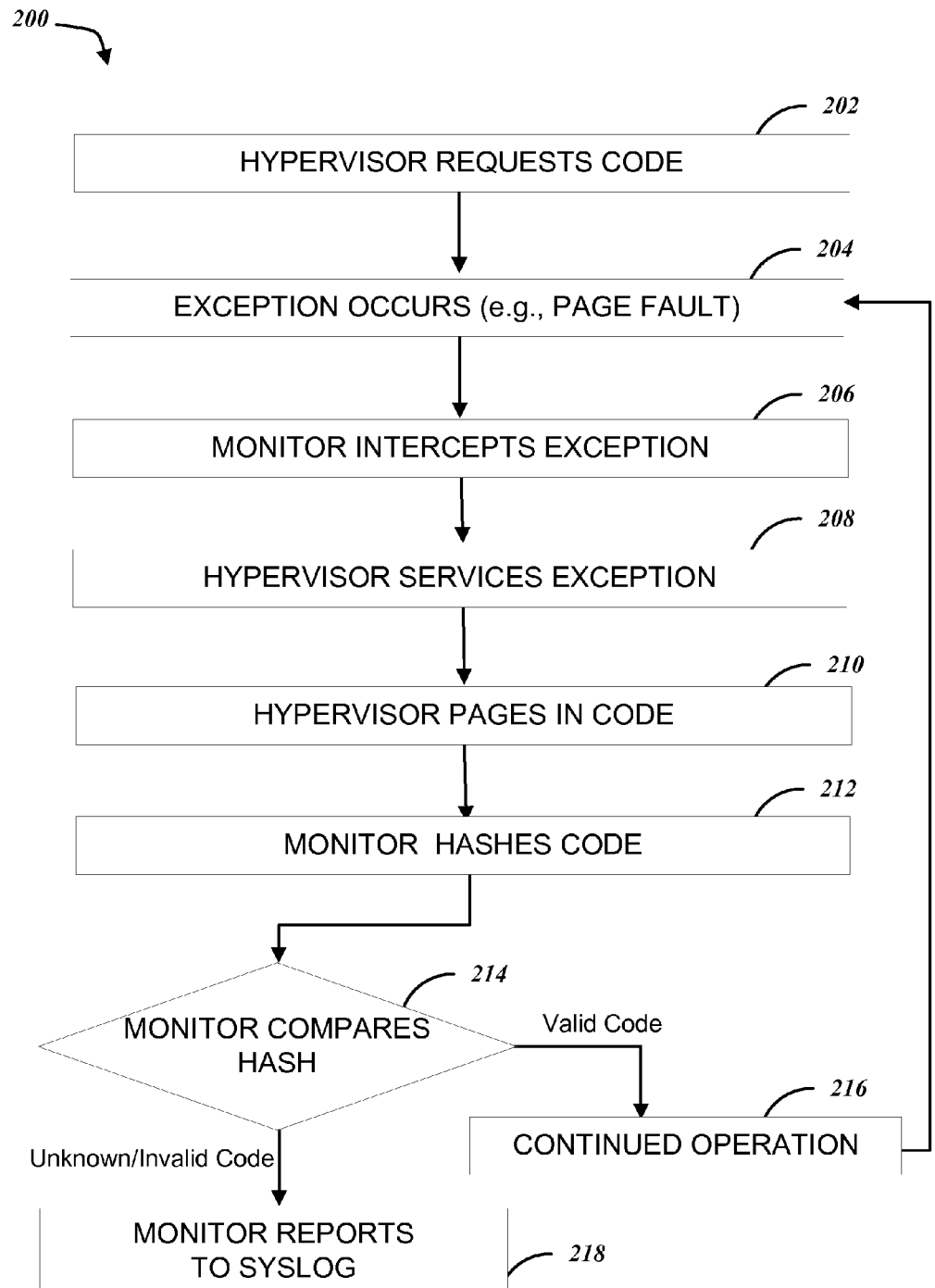
FIG. 2 illustrates a scheme for monitoring a hypervisor of a host system, in accordance with some embodiments.

FIG. 2 illustrates a scheme 200 for monitoring a hypervisor of a host system, such as system 100 of FIG. 1. At 202, the hypervisor, such as hypervisor 110 of FIG. 1, may request instruction code for execution by a processor of the host system. The instruction code may be executed for the operation of the hypervisor or for a guest, such as any one of the virtual machines 112 of FIG. 1.

At 204, instruction code that is not already loaded in memory may cause an exception, such as a page fault, to be generated by the processor. At 206, a monitor, such as monitor 102 of FIG. 1 may intercept the exception. The interception of the exception may allow the monitor to determine what memory is being requested for execution by the processor. In an example, the monitor may set a break point in the sequence of instructions being executed by the processor to allow the processor to continue execution until the requested memory is loaded.

At 208, the monitor may relinquish control of the processor and allow the hypervisor to service the exception. At 210, the hypervisor may page in the instruction code in order to service the exception and allow the hypervisor or guest to continue execution. At 212, the monitor may perform a hash of the instruction code that was loaded by the hypervisor. In an example, the execution of the hypervisor is paused when the processor reaches the previously set break point in the sequence of instructions being executed by the processor.

At 214, the monitor may compare the result of the hash with a set of known hashes that correspond to the executing program code, or with a set of known or suspected malware. If the hash comparison indicates that the loaded code is valid, then, at 216, operation continues and the processor executes the code. In an example, the hypervisor is unaware that the monitor has transparently performed these operations. In this manner the monitor may gain introspection directly into the operation and integrity of either or both of the hypervisor and the guest code operating on a virtual machine.

At 218, if the comparison of the hash at 214 indicates that the code is invalid or unknown the monitor may report the discrepancy to a system administrator, for example by making an entry in a system log (SYSLOG). In an example, if the comparison of the hash at 214 indicates that the code is part of a program that is known malware or otherwise malicious the execution of the code by the processor may be prevented by the monitor.

Figure 3:
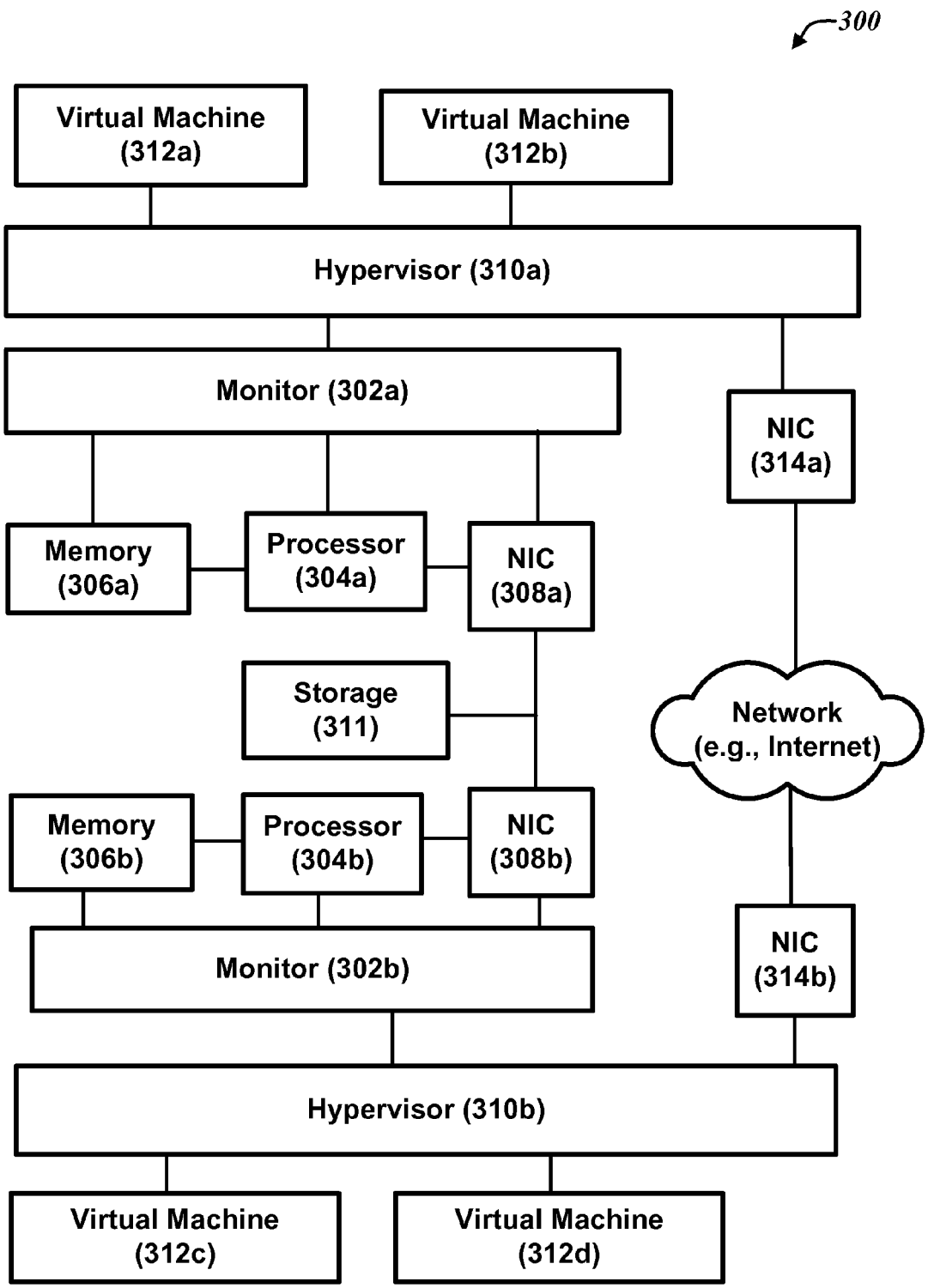
FIG. 3 illustrates an example block diagram of a multi-processor host system, in accordance with some embodiments.

FIG. 3 illustrates an example block diagram of a multi-processor host system 300 protected by monitors 302. The monitors 302 may directly interact with components of the host system, such as processors 104, memories 306, and NICs 308. The host system 300 may include storage 311 on an internal network (e.g., intranet or storage area network (SAN)). The monitors 302 may be nested between the hardware of the host system 300 and hypervisors 310. The hypervisors 310 may manage and monitor guest operating systems forming virtual machines 312. One or more operating systems may be utilized on virtual machines 312.

The hypervisors 310 may be configured to communicate with a network (e.g., the Internet) via NICs 314. In this manner the hypervisors 310 may allow the virtual machines 312 access to the network while limiting or preventing the virtual machines 312 from directly interacting with other hardware (e.g., storage 311) of the host system 300.

In an example, the monitors 302 may be configured to detect malicious code that is attempting to circumvent the guest machine sandbox environments formed by the virtual machines 312. In response to the detection of malicious code the monitors 302 may prevent processors 304 from executing the malicious code.

Figure 4:
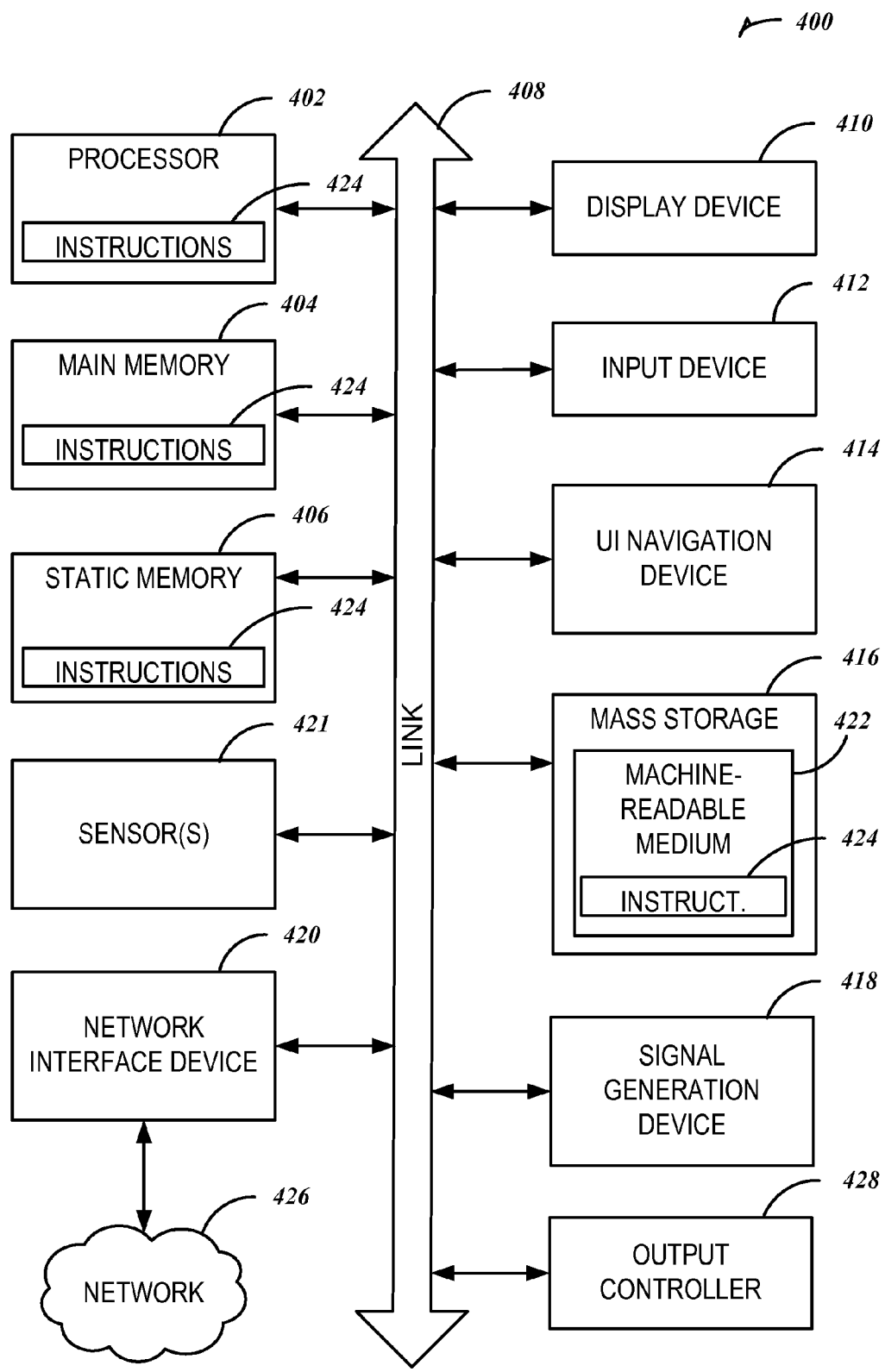
FIG. 4 illustrates a block diagram of an example machine upon which any one or more of the techniques discussed herein may be performed.

FIG. 4 illustrates a block diagram of an example machine 400 upon which any one or more of the techniques (e.g., methodologies) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in a peer-to-peer (P2P) (or other distributed) network environment. The machine 400 may be a personal computer (PC), a tablet PC, a personal digital assistant (PDA), a mobile telephone, a web appliance, or any machine capable of executing instructions (sequential or otherwise) that specify actions to be taken by that machine. The machine 400 may operate as a defended system (e.g., system 202 of FIG. 2), as a monitor (e.g., monitor 201 of FIG. 2), or as a single unit with both a monitor and an active device (e.g., apparatus 300 of FIG. 3). Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a processing unit, a graphics processing unit (GPU), a hardware processor core, or any combination thereof), a main memory 404, and a static memory 406, some or all of which may communicate with each other via a link 408 (e.g., a bus, link, interconnect, or the like). The machine 400 may further include a display device 410, an input device 412 (e.g., a keyboard), and a user interface (UI) navigation device 414 (e.g., a mouse). In an example, the display device 410, input device 412, and UI navigation device 414 may be a touch screen display. The machine 400 may additionally include a mass storage (e.g., drive unit) 416, a signal generation device 418 (e.g., a speaker), a network interface device 420, and one or more sensors 421, such as a global positioning system (GPS) sensor, camera, video recorder, compass, accelerometer, or other sensor. The machine 400 may include an output controller 428, such as a serial (e.g., USB, parallel, or other wired or wireless (e.g., infrared (IR)) connection to communicate or control one or more peripheral devices (e.g., a printer, card reader, etc.).

The mass storage 416 may include a machine-readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the mass storage 416 may constitute machine readable media.

While the machine-readable medium 422 is illustrated as a single medium, the term "machine readable medium" may include a single medium or multiple media (e.g., a centralized or distributed database, and/or associated caches and servers) that configured to store the one or more instructions 424.

The term "machine-readable medium" may include any tangible medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 400, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on one or more computer-readable storage devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A hypervisor monitor system comprising:
   one or more processors coupled to a memory, the one or more processors configured to execute instructions in the memory and generate an exception in response to a page fault;
   a hypervisor configured to operate on the one or more processors and to manage execution of a plurality of virtual machines on the one or more processors;
   a hashing module configured to calculate a mathematical hash of at least a portion of the instructions in the memory;
   a database isolated from the hypervisor, the database configured to store a list of mathematical hashes of registered code and a list of mathematical hashes of malware;
   a monitor configured to provide an interface between the one or more processors and the hypervisor, the monitor configured to respond to the exception by performing a comparison of the mathematical hash of a page of instructions loaded into the memory by the hypervisor with the list of mathematical hashes of registered code;
   a first network interface coupled to the monitor and isolated from the hypervisor; and
   a second network interface coupled to the hypervisor, the second network interface configured to be accessible by the plurality of virtual machines;
   wherein the monitor is configured, in response to the comparison, to prevent the one or more processors from executing the page of instructions when the comparison indicates the mathematical hash of the page of instructions is not included in the list of mathematical hashes of registered code.

2. The system of claim 1, wherein the memory includes a page of memory in a virtual address space.

3. The system of claim 1, wherein:
   the hypervisor comprises a first hypervisor; and
   the monitor comprises a second hypervisor configured to monitor the first hypervisor.

4. The system of claim 1, wherein the monitor is configured to prevent the execution by the one or more processors of a portion of instructions for which, when provided to the hashing module, the hashing module calculates a mathematical hash value that is included in the list of mathematical hashes of malware.

5. The system of claim 1, wherein the list of mathematical hashes of registered code includes hash values that correspond to a plurality of portions of a valid image of instructions of the hypervisor and to a valid image of instructions of a guest program operating on at least one of the plurality of virtual machines.

6. The system of claim 5, wherein the monitor is configured to only allow the execution by the one or more processors of instructions that yield a hash value that is included in the list of mathematical hashes of registered code.

7. The system of claim 1, wherein:
   the hashing module is configured to calculate each of the mathematical hashes utilizing a non-cryptographic hash routine configured to generate a thirty-two bit value from a portion of the instructions in a four-kilobyte page of the memory; and
   each of the mathematical hashes is assigned the thirty-two bit value.

8. The system of claim 1, wherein:
   the first network interface comprises a first network interface card coupled to the monitor and isolated from the hypervisor; and
   the second network interface comprises a second network interface card coupled to the hypervisor.

9. The system of claim 1, wherein the monitor is configured to receive the list of mathematical hashes of registered code via the first network interface.

10. A method of monitoring execution of a hypervisor by at least one processor, the method comprising:
    monitoring an exception handler of the hypervisor, the hypervisor including at least one guest program executing on one or more virtual machines, the hypervisor configured to service a page fault exception from the at least one processor, the hypervisor isolated from a first network interface and coupled to a second network interface that is accessible by the one or more virtual machines, the first network interface operatively coupled to the at least one processor;

generating a page identifier by performing an identification analysis of a set of instructions loaded by the exception handler in response to the page fault;

comparing the page identifier with a list of identifiers that correspond to at least one of: an executable program of the hypervisor or an executable program of the at least one guest program;

allowing the at least one processor to execute the set of instructions loaded by the exception handler when the page identifier is included in the list of identifiers;

preventing the at least one processor from executing the set of instructions when the page identifier is not included in the list of identifiers; and maintaining a database isolated from the hypervisor, the database including a list of mathematical hashes of registered code and a list of mathematical hashes of malware.

11. The method of claim 10, wherein performing the identification analysis includes mathematically hashing, by the at least one processor, the set of instructions, the page identifier representing a result of the mathematical hashing.

12. The method of claim 11, wherein the mathematical hashing includes calculating a thirty-two bit value from a portion of the instructions in a four-kilobyte page of a memory with a non-cryptographic hash routine.

13. The method of claim 10, further comprising:
preventing the at least one processor from executing the set of instructions when the page identifier is included in the list of mathematical hashes of malware.

14. The method of claim 10, further comprising:
generating the list of identifiers that correspond to the executable program of the at least one guest program prior to installation of the executable program for execution on the one or more virtual machines.

15. A non-transitory machine readable storage medium encoded with instructions that, in response to being executed, cause at least one processor to:

monitor an exception handler of a hypervisor, the hypervisor including at least one guest program executing on one or more virtual machines, the hypervisor configured to service a page fault exception from the at least one processor, the hypervisor isolated from a first network interface and coupled to a second network interface that is accessible by the one or more virtual machines, the first network interface operatively coupled to the at least one processor;

generate a page identifier by performing an identification analysis of a set of instructions loaded by the exception handler in response to the page fault;

compare the page identifier with a list of identifiers that correspond to at least one of: an executable program of the hypervisor or an executable program of the at least one guest program;

allow the at least one processor to execute the set of instructions loaded by the exception handler when the page identifier is included in the list of identifiers;

prevent the at least one processor from executing the set of instructions when the page identifier is not included in the list of identifiers; and maintain a database isolated from the hypervisor, the database including a list of mathematical hashes of registered code and a list of mathematical hashes of malware.

16. The non-transitory machine readable storage medium as recited in claim 15, wherein the identification analysis includes mathematically hashing, by the at least one processor, the set of instructions, the page identifier representing a result of the mathematical hashing.

17. The non-transitory machine readable storage medium as recited in claim 16, wherein the mathematical hashing includes calculating a thirty-two bit value from a portion of the instructions in a four-kilobyte page of a memory with a non-cryptographic hash routine.

18. The non-transitory machine readable storage medium as recited in claim 16, further comprising instructions that, in response to being executed, cause the at least one processor to:
prevent the at least one processor from executing the set of instructions when the page identifier is included in the list of mathematical hashes of malware.

19. The non-transitory machine readable storage medium as recited in claim 16, further comprising instructions that, in response to being executed, cause the at least one processor to:
generate the list of identifiers that correspond to the executable program of the at least one guest program prior to installation of the executable program for execution on the one or more virtual machines.

20. The method of claim 10, wherein monitoring the exception handler of the hypervisor is performed by a second hypervisor different from the hypervisor.

* * * * *